(12) United States Patent
Mann, III

(10) Patent No.: US 11,708,912 B2
(45) Date of Patent: Jul. 25, 2023

(54) VALVE TRIM APPARATUS FOR USE WITH CONTROL VALVES

(71) Applicant: FISHER CONTROLS INTERNATIONAL LLC, Marshalltown, IA (US)

(72) Inventor: Julian Adin Mann, III, Cleveland Heights, OH (US)

(73) Assignee: FISHER CONTROLS INTERNATIONAL LLC, Marshalltown, IA (US)

(*) Notice: Subject to any disclaimer, the term of this patent is extended or adjusted under 35 U.S.C. 154(b) by 0 days.

(21) Appl. No.: 17/449,594

(22) Filed: Sep. 30, 2021

(65) Prior Publication Data
US 2023/0098518 A1    Mar. 30, 2023

(51) Int. Cl.
*F16K 3/26* (2006.01)
*F16K 47/02* (2006.01)

(52) U.S. Cl.
CPC ............. *F16K 3/267* (2013.01); *F16K 47/02* (2013.01)

(58) Field of Classification Search
CPC ........... F16K 3/267; F16K 47/02; F16K 47/08
See application file for complete search history.

(56) References Cited

U.S. PATENT DOCUMENTS

| 7,073,532 B2 * | 7/2006 | Bowe | F16K 3/265 |
| | | | 137/625.33 |
| 2018/0112800 A1 * | 4/2018 | Griffin, Jr. | F16K 47/08 |
| 2018/0128294 A1 * | 5/2018 | Sundararajan | F16K 3/26 |
| 2019/0338865 A1 * | 11/2019 | Griffin, Jr. | F16K 3/246 |

* cited by examiner

*Primary Examiner* — Patrick C Williams
(74) *Attorney, Agent, or Firm* — Hanley, Flight & Zimmerman, LLC

(57) ABSTRACT

Methods, apparatus, systems and articles of manufacture for reducing noise and/or cavitation in valves are disclosed. An example disclosed herein includes a valve including a valve body including a fluid inlet, a fluid outlet, and a fluid passageway extending between the fluid inlet and the fluid outlet, and a valve trim apparatus disposed in the fluid passageway, the valve trim apparatus including a plug and a cage, the plug circumscribing the cage, the plug including first openings, the cage including second openings, the plug movable relative to the cage between a first position to enable fluid communication between the first openings of the plug and the second openings of the cage, and a second position to prevent fluid communication between the first openings of the plug and the second openings of the cage.

20 Claims, 7 Drawing Sheets

VALVE TRIM APPARATUS FOR USE WITH CONTROL VALVES

FIELD OF THE DISCLOSURE

This disclosure relates generally to fluid valves and, more particularly, to valve trim apparatus for use with control valves.

BACKGROUND

Control valves are often used in process control plants or systems to control the flow of process fluid. Some control valves (e.g., globe valves) commonly include a valve cage with openings through which the fluid can flow when the valve is in an open position. As the fluid exits the openings of the cage, the fluid typically interacts with a relatively stationary or low velocity fluid at an outlet of the control valve, which can cause noise and/or cavitation.

SUMMARY

An example valve disclosed herein includes a valve body including a fluid inlet, a fluid outlet, and a fluid passageway extending between the fluid inlet and the fluid outlet. A valve trim apparatus is disposed in the fluid passageway, the valve trim apparatus including a plug and a cage. The plug circumscribes the cage. The plug includes first openings. The cage includes second openings. The plug is movable relative to the cage between a first position to enable fluid communication between the first openings of the plug and the second openings of the cage, and a second position to prevent fluid communication between the first openings of the plug and the second openings of the cage.

An example apparatus disclosed herein includes a plug including a sidewall having first openings. The plug defines a cavity. The apparatus includes a cage positioned in the cavity of the plug. The cage has an inner cage portion including a lattice structure having second openings and an outer cage portion circumscribing the inner cage portion, the outer cage portion including third openings. The plug is movable relative to the cage.

An example cage disclosed herein is configured to be disposed in a fluid passageway of a valve body. The cage includes an inner cage portion including a lattice structure providing first openings between an upper edge of the cage and a lower edge of the cage. The lattice structure includes an aperture at an edge of the cage proximate the lower edge. An outer cage portion circumscribes the inner cage portion. The outer cage portion contains second openings.

Figure 1:
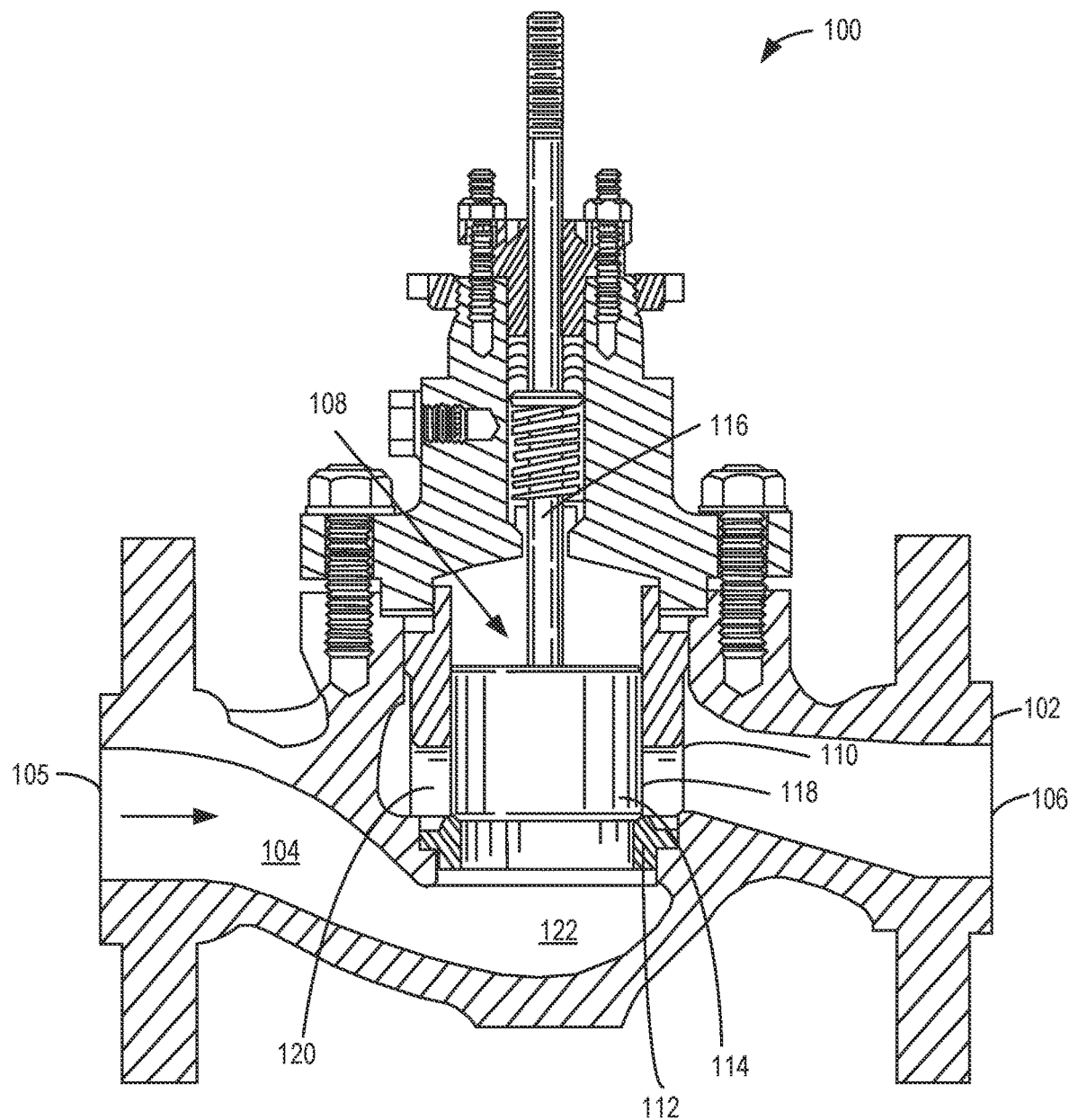
FIG. 1 is a cross-sectional view of a known control valve.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Process control systems employ fluid control valves to control the flow of fluid from a first location to a second location. When the control valve is in a closed position, the control valve prevents fluid in a high-pressure region at a valve inlet from flowing to a lower-pressure region at a valve outlet. Alternatively, when the control valve is in an open position, the control valve allows fluid to flow from the high-pressure region to the lower-pressure region. Opening and closing of the valve can be performed manually or via a command signal from a process control system communicatively coupled to the control valve.

To reduce pressure of fluid flowing through the control valve, some control valves employ a cage. Typically, the cage is a cylindrical body that includes openings in a sidewall of the cage through which the fluid flows when entering and/or exiting the valve. In sliding stem valves, a plug is implemented or disposed within the cage to control fluid flow through the openings of the cage as the fluid flows between the inlet and the outlet of the control valve. The plug can move within a cavity or opening (e.g., an axial opening of the cage) in a rectilinear direction (e.g., upward and downward with respect to the cage along a central axis of the cage). To control the flow of fluid through the openings of the cage, the plug includes a solid sidewall (e.g., a sidewall without openings). In particular, the plug can move between a fully closed position and a fully open position. In a fully closed position, the sidewall of the plug blocks the openings of the cage to prevent fluid flow through the cage and, thus, between the inlet and the outlet of the control valve. In the fully open position, the sidewall of the plug uncovers the openings of the cage to allow fluid flow through the cage and, thus, between the inlet and the outlet of the control valve. In some cases, placement of the plug in a partially open position can vary (e.g., reduce) a flow rate of the fluid compared to the flow rate of fluid when the plug is in the fully open position.

During operation, the fluid undergoes a pressure drop across an orifice of the valve when the valve plug moves from a closed position to an open position, thereby causing a velocity of the fluid to increase through a passageway of the control valve. For example, a sudden pressure drop can occur when the plug moves from the closed position to the open position. In some examples, the fluid has a relatively high pressure upstream from the cage and a reduced pressure downstream from the cage. As the fluid flows through the restriction of an open or partially open valve, a velocity of the fluid increases while a pressure of the fluid decreases. As high-velocity fluid exits the valve, the high-velocity fluid interacts with relatively stationary or low-velocity fluid at the lower-pressure region. The interaction of fluids occurs at a shear layer between the high-velocity fluid and the stationary or low-velocity fluid. In such cases, noise (e.g., excessive noise) is caused by an increase in turbulence at the shear layer.

In some examples, if the fluid pressure falls below a vapor pressure of the fluid, the pressure can cause vapor bubbles to form in the fluid. When the pressure recovers downstream as the fluid exits the valve outlet, the vapor bubbles can implode, causing high pressure waves. This phenomenon, herein referred to as cavitation, can cause significant noise and/or vibration. In some examples, cavitation can cause damage to the control valve and/or downstream piping (e.g., due to vibration, corrosion and/or erosion). Damage to the valve due to cavitation can cause the valve to reduce a sealing capacity and/or a sealing rating of the valve. In some examples, a sealing capability of a control valve can degrade such that the control valve cannot achieve a full shut-off (e.g., allowing fluid to pass from the inlet to the outlet when the valve is in a fully closed position).

Example valve trim apparatus disclosed herein reduce noise and/or cavitation during operation of the valve. To reduce noise and/or cavitation, example valve trim apparatus disclosed herein provide or enable a gradual pressure drop across the valve (e.g., across the plug and/or cage) as a valve plug moves from a closed position to an open position. Example valve trim apparatus disclosed herein prevent or reduce sudden pressure drops across the valve (e.g., orifice) that can otherwise cause cavitation and/or noise. To reduce cavitation and/or noise, an example control valve disclosed herein includes an example cage having an inner cage portion including a lattice structure. Example cages disclosed herein include an outer cage portion disposed around (e.g., completely encasing) the lattice structure of the inner cage portion. An example outer cage portion disclosed herein can include a plurality of first openings to facilitate jet independence (e.g., prevent jet coalescence). Example valve trim apparatus disclosed herein include a plug having a plurality of second openings. Example plugs disclosed herein can include an inner surface configured to slide along an outside surface of the outer cage portion of the cage to control fluid flow through the control valve. In some examples, an inner surface of the plug moves relative to an outer surface of the cage to provide valve shutoff. As used herein, valve shutoff means a condition or state of the control valve to prevent fluid from passing between the inlet and the outlet when the valve plug is in a closed position (e.g., such that no fluid passes between an inlet and an outlet of the valve). In some examples, an example cage disclosed herein includes an outlet edge defined by a hyperbolic indentation adjacent (e.g., that leads into) the lattice structure. Specifically, example trim apparatus disclosed herein can include the example outlet edge (e.g., a hyperbolic feature) to break up flow and/or direct flow toward a central or longitudinal axis of the cage. In some examples disclosed herein, the plug moves relative to (e.g., over) the cage to vary an area of the inlet flow exposed to the lattice structure. In some examples, each of the first openings of the example cage has a first diameter and each of the second openings of the example plug has a second diameter. In some examples, the first diameter and second diameter are substantially equivalent (e.g., identical or within 10 percent). In some examples, the first diameter and the second diameter are different (e.g., diameters differ by values greater than 10 percent).

Example plugs disclosed herein can move between a first position (e.g., an open position) in which the example first openings are substantially aligned (e.g., coaxially aligned) relative to the example second openings and a second position (e.g., a closed position) in which the example first openings are not aligned (e.g., not overlapping, offset) relative to the example second openings. Fluid can flow through the plug and the cage (e.g., the outer layer) when the plug is in the first position (e.g., an open position). When the plug is in the second position (e.g., a closed position) relative to the cage, the plug prevents fluid from flowing between an inlet and an outlet of a valve body. Furthermore, the plug can be positioned relative to the cage and/or a valve seat to control a flow rate of the fluid by controlling a position (e.g., by varying an area of overlap between the first and second openings). For example, increasing an area of overlap between the first and second openings of the respective plug and cage (e.g., an amount of coaxial alignment between the first and second openings openings) increases a flow rate of a process fluid through a valve body of the control valve, and reducing the area of overlap between the first and second openings of the respective plug and cage (e.g., offsetting the first and second openings so that the first and second openings are not coaxially aligned) reduces a flow rate of a process fluid through a valve body of the control valve. Advantageously, examples disclosed herein can control pressure drop(s) and/or flow rate(s) of a process fluid through a valve to reduce or prevent noise and/or cavitation. Example trim apparatus disclosed herein can provide gradual pressure reduction in a fluid as fluid flows through the valve and reduce sudden pressure drops to reduce cavitation. While examples disclosed herein can be used in any type of valve (e.g., rotary valves, sliding stem valves, etc.), examples disclosed herein are described in association with sliding stem control valves.

FIG. 1 is a cross-sectional view of a known control valve 100. Example valve trim apparatus disclosed herein can be implemented with the control valve 100 of FIG. 1. The control valve 100 of FIG. 1 includes a valve body 102 defining a fluid passageway 104 between a fluid inlet 105 and a fluid outlet 106. The control valve 100 includes a trim assembly 108 positioned in the fluid passageway 104 of the valve body 102 between the fluid inlet 105 and the fluid outlet 106. The trim assembly 108 includes a cage 110, a valve seat 112, and a plug 114 (e.g., fluid control member). The plug 114 is slidably disposed in a cavity of the cage 110 and movable relative to the valve seat 112 (e.g., and the cage 110) to control fluid flow through the fluid passageway 104. To move the plug 114 relative to the cage 110, the plug 114 is coupled to an actuator (not shown) via a valve stem 116. The actuator moves the plug 114 in a first direction (e.g., an upward direction in the orientation of FIG. 1) away from the valve seat 112 to an open position to allow fluid flow from the fluid inlet 105 to the fluid outlet 106 via the fluid passageway 104. Conversely, the actuator moves the plug 114 in a second direction (e.g., in a downward direction in the orientation of FIG. 1) toward the valve seat 112 to a closed position to prevent fluid from flowing between the fluid inlet 105 and the fluid outlet 106. In some examples, the flow direction can be reversed (e.g., the fluid flows through the valve body 102 from the fluid outlet 106 to the fluid inlet 105). In some examples, the control valve 100 can be positioned in a partially open position or in a partially closed position (e.g., between a fully open position and a fully closed position) to control the flow rate through the control valve 100.

The plug 114 of FIG. 1 has a solid (e.g., contiguous) sidewall 118. The plug 114 moves within a cavity of the cage 110 between a closed position such that the sidewall 118 covers an opening 120 of the cage 110 to prevent fluid flow through the fluid passageway 104 and an open position such that the sidewall 118 uncovers the opening 120 to allow fluid flow through the fluid passageway 104. As such, when the control valve 100 moves from a closed position to an open position, a sudden pressure drop of fluid through the cage 110 can occur, which can cause a velocity of a process fluid to increase rapidly. In some instances, the high-velocity fluid interacts with stationary fluid downstream (e.g., at an outlet or downstream) of the cage 110. The interaction of fluids can cause noise and/or cavitation in the control valve 100, which can reduce functionality and/or degrade a performance characteristic (e.g., a shutoff classification) of the control valve 100. In particular, cavitation can cause vibration and/or damage to one or more components of the control valve 100 such that more frequent replacement and/or repair of the control valve 100 may be needed. Cavitation of the control valve 100 can also degrade sealing capability of the control valve 100. While the control valve 100 is maintained in an open state, in some instances, cavitation can continue to occur as fluid flows through the control valve 100.

Additionally, in some instances when the control valve 100 operates in a flow up configuration (e.g., fluid flows from the fluid inlet 105 to the fluid outlet 106), a flow circulation condition can occur in a lower area 122 (e.g., a lower bowl area) when the valve plug 114 moves toward an open position from a closed position. In some instances, such flow circulation condition can occur when a low noise trim is used. The flow circulation condition can occur in the lower area 122 due to flow separation as fluid flows into an inner area of the cage 110 from the fluid passageway 104 when a portion inside the cage 110 is exposed to fluid flow from the fluid passageway 104 as the valve plug 114 disengages from the valve seat 112. The flow circulation condition can become unstable causing unstable plug motion and cause significant vibration of the control valve 100 and connected piping. Further, the existence of the flow circulation condition as well as a size and stability of the flow circulation can vary based on a travel stroke of the valve plug 114 due to changes in a volume of the exposed portion of the inner area of the cage 110.

Figure 2A:
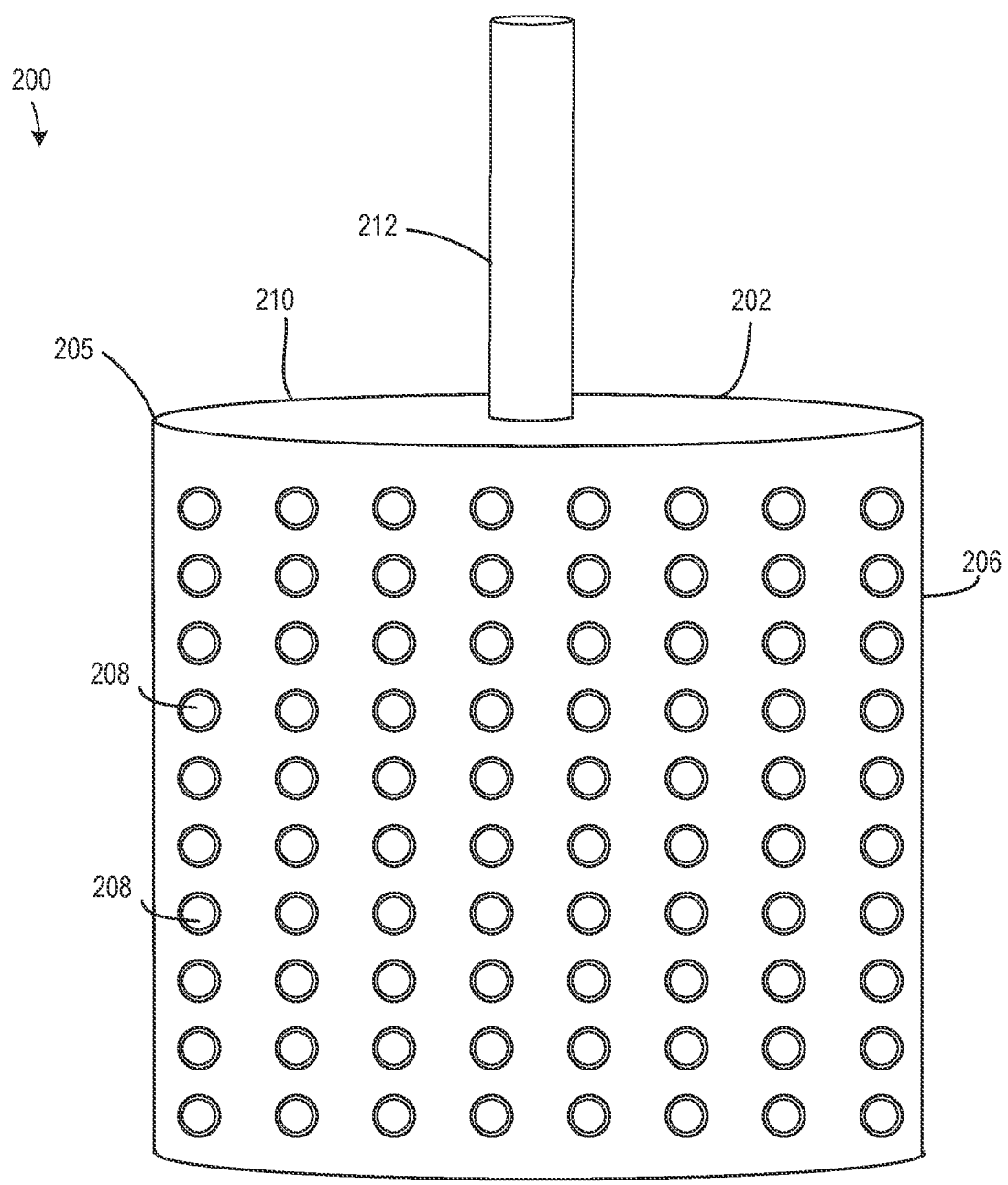
FIG. 2A is a side view of an example valve trim apparatus in accordance with teachings of this disclosure.
Figure 2B:
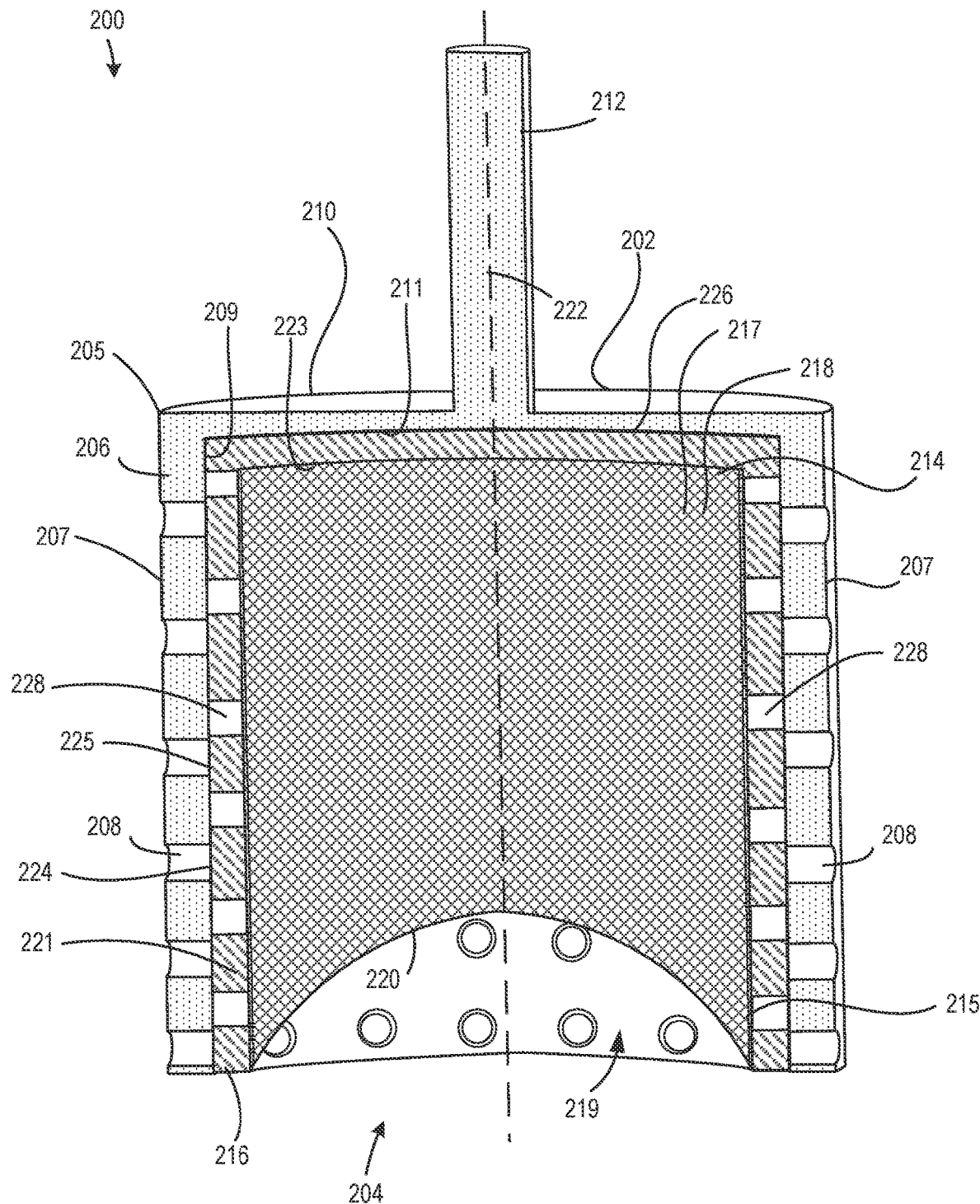
FIG. 2B is a perspective cross-sectional view of the example valve trim apparatus of FIG. 2A.

FIG. 2A is a side view of an example valve trim apparatus 200 in accordance with the teachings disclosed herein. FIG. 2B is a partial, perspective cross-sectional view of the example valve trim apparatus 200 of FIG. 2A. The example valve trim apparatus 200 disclosed herein can be implemented within the control valve 100 of FIG. 1. The example valve trim apparatus 200 disclosed herein includes a plug 202 and a cage 204. The example cage 204 and the example plug 202 of FIGS. 2A and 2B differ from the known cage 110 and known plug 114 of FIG. 1.

Referring to FIGS. 2A and 2B, the plug 202 of the illustrated example is circumferentially disposed around the example cage 204. For instance, the plug 202 of the illustrated example includes a body 205 (e.g., a cylindrical body) defining a sidewall 206 (e.g., an annular sidewall), an upper wall 210, and a cavity 211. In the illustrated example, the cage 204 is positioned (e.g., completely or fully disposed) within the cavity 211 of the plug 202. For example, the plug 202 circumscribes (e.g., fully surrounds or encircles) the cage 204. In the illustrated example, a valve stem 212 is coupled to the upper wall 210 to couple the plug 202 to an actuator. In the illustrated example, the valve stem 212 is coupled to the plug 202 via welding. However, in some examples, the valve stem 212 can be threaded to the upper wall 210 and/or integrally formed with the upper wall 210 and/or the plug 202. The sidewall 206 of the illustrated example is a cylindrical or annular wall. In some examples, the sidewall 206 can have a rectangular shape and/or any other shape. An inner surface 209 of the sidewall 206 is configured to slide along an outer surface 225 of the example cage 204.

The sidewall 206 of the plug of the illustrated example includes a plurality of first openings 208. The first openings 208 allow fluid communication between an outer surface 207 of the sidewall 206 and the inner surface 209 of the sidewall 206. The first openings 208 of the illustrated example are disposed around an entire perimeter or circumference (e.g., an annular circumference) of the plug 202. However, in some examples, the first openings 208 can be partially disposed around (e.g., about between 50% and 75%) a circumference of the plug 202. For example, the first openings 208 can be formed along a first portion of the sidewall 206 and a second portion of the sidewall 206 can be a solid wall (i.e., without the first openings 208). The first openings 208 of the example plug 202 have circular cross-sections with a first (e.g., constant) diameter. In some examples, first ones of the first openings 208 can have a first diameter and second ones of the first openings 208 can have a second diameter different than the first diameter. In some examples, the first openings 208 can be a slot having an elongated cross-section, a rectangular cross-section and/or have any other cross-sectional shape.

The cage 204 of FIG. 2A or 2B includes an inner cage portion 214 and an outer cage portion 216. The inner cage portion 214 defines a body 215 (e.g., a cylindrical body) including second openings 218 formed or configured in a lattice pattern 217. As shown in the illustrated example, each of the second openings 218 has a diamond shape. In some examples, the second openings 218 can have a rectangle shape, a square shape, a parallelogram shape and/or any other shape formed in a lattice pattern. Alternatively, the second openings 218 can be defined by a hexagonal lattice, a triangular lattice, and/or any other type of lattice. The lattice pattern 217 is formed around an entire circumference or annular wall of the inner cage portion 214. In some examples, the lattice pattern 217 can be formed around a portion of a circumference or annular wall of the inner cage portion 214. For instance, the lattice pattern 217 can be formed around a first portion of the annular wall via the openings 218 and a second portion of the annular wall different than the first portion can be formed as a solid wall without the lattice pattern 217 (e.g., the openings 218) and/or the second portion can be formed with other types of openings (e.g., openings that are similar to the first openings 208, larger diameter openings compared to a size of the second openings 218, etc.).

The lattice pattern 217 and/or the inner cage portion 214 can be a metal or metal alloy lattice structure fabricated via, for example, casting, additive manufacturing and/or any other manufacturing process(es). As such, a shape, size, and/or spacing of the second openings 218 can advantageously be varied (e.g., customized) based on a desired fluid flow characteristic (e.g., a maximum flow rate, a maximum pressure drop, etc.). In some examples, the inner cage portion 214 has a first lattice density. In some examples, the inner cage portion 214 has a first portion or section having a first lattice density and a second portion or section having a second lattice density different (e.g., greater or less) than the first lattice density. The first and/or second lattice densities can be defined based on a volumetric area of the lattice pattern 217. For instance, a lattice density as used herein is a comparison between a volumetric area of a lattice pattern and a volumetric area which does not include a lattice pattern. For example, a first lattice density that is less than a second lattice density can provide a greater volumetric flow area than the second lattice density.

The inner cage portion 214 of the illustrated example includes an example outlet edge 220 defining an opening or passageway 219 (e.g., an aperture) of the inner cage portion 214. The example outlet edge 220 is positioned at an edge (e.g., a lower edge) of the cage 204 opposite the valve stem 212 and/or the upper wall 210. The outlet edge 220 of FIG. 2B when observed on a cross-section including a central axis 222 has a hyperbolic cross-sectional shape. In some examples, the outlet edge 220 can have a triangular cross-sectional shape and/or any other cross-section tapered toward the central axis 222 of the inner cage portion 214. For example, the outlet edge 220 is a cutout that defines the passageway 219 in the inner cage portion 214. In the illustrated example, the passageway 219 is an opening or gap that does not include the lattice pattern 217.

The outer cage portion 216 of FIGS. 2A and 2B includes a body 221 (e.g., a cylindrical body) defining a cage sidewall 224 (e.g., an annular sidewall) and a cage upper wall 226. The cage sidewall 224 defines a cavity 223 to receive the inner cage portion 214. For example, the outer cage portion 216 is circumferentially disposed around the inner cage portion 214. In other words, the inner cage portion 214 of the illustrated example is disposed (e.g., completely or fully disposed) in the cavity of the outer cage portion 216. The outer cage portion 216 and the inner cage portion 214 of the illustrated example are fixedly coupled. In some examples, the inner cage portion 214 and the outer cage portion 216 are manufactured as a unitary piece or structure (e.g., via additive manufacturing).

The cage sidewall 224 includes a plurality of third openings 228. In the illustrated example, the third openings 228 have a third diameter (e.g., different than a size of the second openings 218 and/or a diameter of the first openings 208). The third openings 228 provide fluid communication between the outer surface 225 of the sidewall 224 and the inner cage portion 214. In the illustrated example, the third openings 228 have a cylindrical shape having a circular cross-section. In some examples, the third openings 228 can be slots having an elongated cross-section, can have a rectangular cross-section, and/or can have any other shape (s). In the example of FIG. 2B, the third diameter of the third openings 228 is substantially equivalent to (e.g., identical or within 10%) the first diameter of the first openings 208. In some examples, the third diameter of the third openings 228 is smaller than the first diameter of the first openings 208. In other examples, the third diameter is larger than the first diameter.

In the illustrated example of FIGS. 2A and 2B, the cross-sectional area or flow through area of each of the second openings 218 can be less than a corresponding cross-sectional dimension or flow through area of each of the first openings 208 and/or each of the third openings 228. In some examples, the cross-sectional area or flow through area of each of the second openings 218 is less than twenty-five percent (25%) of the corresponding cross-sectional area or flow through area of each of the first openings 208. In some examples, the cross-sectional area or flow through area of each of the second openings 218 is less than ten percent (10%) of the corresponding cross-sectional area or flow through area of each of the first openings 208. In still other examples, the cross-sectional area or flow through area of each of the second openings 218 is less than five percent (5%) of the corresponding cross-sectional area or flow through area of each of the first openings 208.

Figure 3:
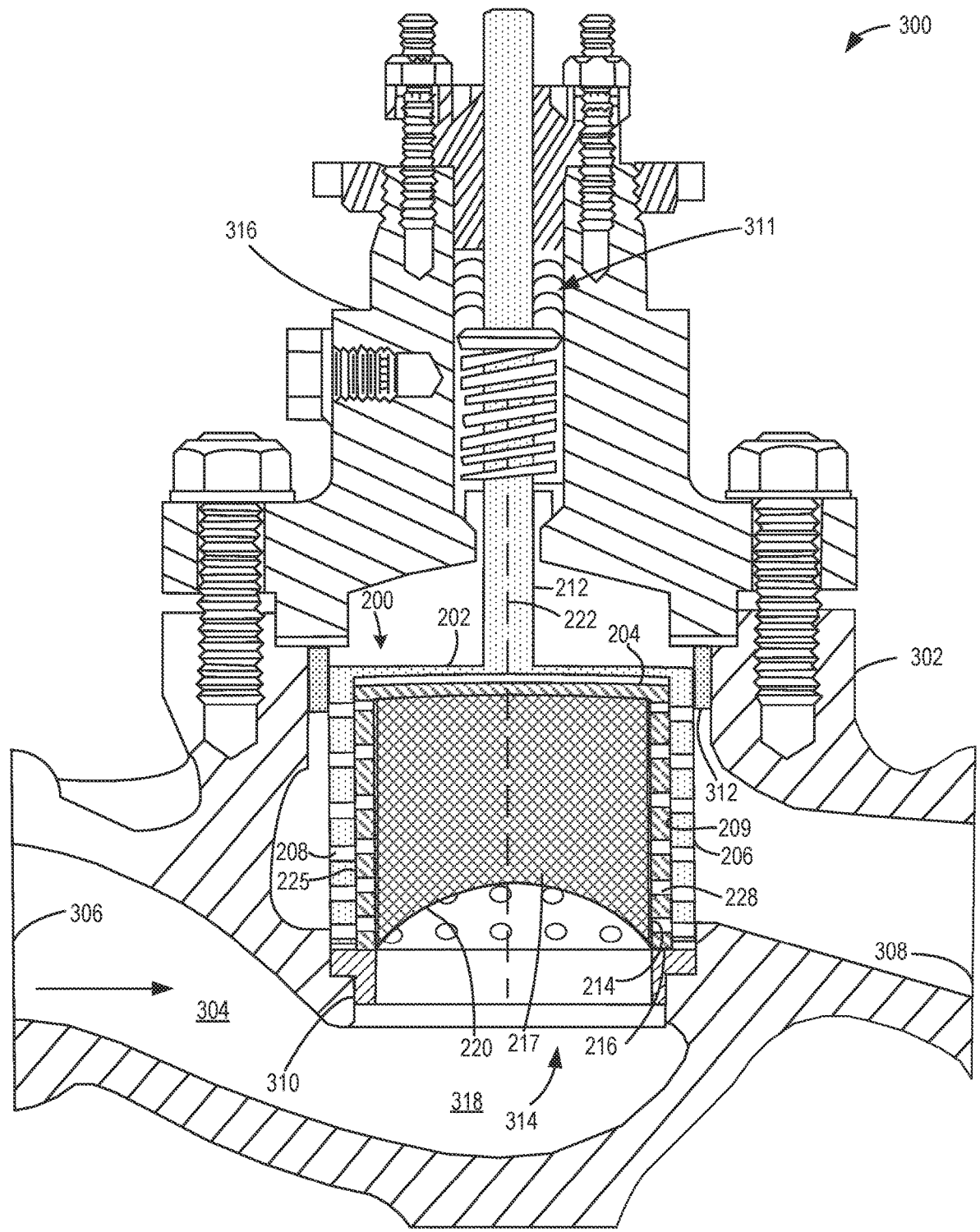
FIG. 3 is a cross-sectional view of an example control valve including the valve trim apparatus of FIGS. 2A and 2B.

FIG. 3 illustrates an example implementation of the valve trim apparatus 200 of FIGS. 2A and 2B implemented with a control valve 300. For example, the control valve 300 of FIG. 3 can be similar to the control valve 100 of FIG. 1. The control valve 300 of FIG. 3 includes a valve body 302 defining a fluid passageway 304 between a fluid inlet 306 and a fluid outlet 308. The valve trim apparatus 200 is positioned in the fluid passageway 304 of the valve body 302 between the fluid inlet 306 and the fluid outlet 308. The example control valve 300 includes a valve seat 310. The valve seat 310 of the illustrated example is coupled to the valve body 302. In some examples, the valve seat 310 is coupled to the valve body 302 via a fastener (e.g., a screw, a rivet, a weld, etc.). In some examples, the fastener provides a means for fastening the valve seat 310 to the valve body 302. In the illustrated example, the valve seat 310 is fixedly coupled to the outer cage portion 216 (e.g., via welding, a fastener, etc.). Thus, in the illustrated example, the outer cage portion 216 is fixedly coupled to the valve body 302 via the valve seat 310. In some examples, the valve seat 310 can be (e.g., integrally) formed with the outer cage portion 216 as a unitary structure (e.g., via additive manufacturing).

In the example of FIG. 3, the plug 202 is slidably disposed within the valve body 302. In the illustrated example, a first seal 312 provides a seal between the plug 202 and the valve body 302. The first seal 312 prevents or restricts fluid from flowing past the plug 202 to the environment via the valve stem 212 and a valve packing 311 positioned in a bonnet 316 of the control valve 300. In some examples, the first seal 312 of FIG. 3 can reduce friction at an interface between the plug 202 and the valve body 302. In some examples, the first seal 312 includes a polymeric material (e.g., Teflon™). In some examples, the first seal 312 includes a rolling bearing and/or any other type of seal(s). In some examples, the first seal can be an O-ring positioned in a cavity or recess formed on an outer surface of the sidewall 206 of the plug 202.

In operation, the plug 202 is (e.g., selectively) moveable relative to the cage 204 and the valve seat 310. In the illustrated example of FIG. 3, an actuator (not shown) moves the plug 202 via the valve stem 212 in a rectilinear direction along the central axis 222 between an open position (e.g., a fully open position) and a closed position (e.g., a fully closed position). In the open position, the first openings 208 of the plug 202 align (e.g., coaxially align) with the third openings 228 of the cage 204. In the open position, alignment between the first openings 208 and the third openings 228 enables fluid communication between the inlet 306 and the outlet 308. Thus, at least partial alignment and/or overlap between the first openings 208 and the third openings 228 enables fluid flow through the plug 202 and the cage 204 (e.g., across an orifice 314). In the closed position, the first openings 208 do not align and/or overlap with the third openings 228 such that the first openings 208 are not in fluid communication with the third openings 228. In the closed position (e.g., a fully closed position), the plug 202 and the cage 204 prevent fluid flow through the fluid passageway 304. Specifically, the inner surface 209 of the plug 202 and the outer surface 225 of the cage 204 form a seal (e.g., between the inlet 306 and the outlet 308) to restrict or prevent fluid flow through the control valve 300. In some examples, the actuator can selectively position the plug 202 at any position along a length of the cage 204 to vary an amount of overlap between the first openings 208 and the third openings 228.

In the illustrated example, the control valve 300 is configured in a flow-up configuration. In a flow-up configuration, fluid flows through the fluid passageway 304 from the fluid inlet 306 to the fluid outlet 308. In the illustrated example, in a flow up configuration, the outlet edge 220 of the inner cage portion 214 provides or defines an inlet of the valve trim apparatus 200. In the flow-up configuration, as the fluid enters the valve trim apparatus 200 through the outlet edge 220, the fluid flows through (e.g., the lattice pattern 217 of) the inner cage portion 214 to the third openings 228 of the outer cage portion 216. In the flow up configuration, the first openings 208 of the sidewall 206 provide or define an outlet of the valve trim apparatus 200 when the first openings 208 align (e.g., at least partially align) with the third openings 228.

Alternatively, the control valve 300 of FIG. 3 can be configured in a flow-down configuration. In a flow-down configuration, the first openings 208 of the sidewall 206 provide or define an inlet of the valve trim apparatus 200. In the flow-down configuration, the outlet edge 220 provides or defines an outlet of the valve trim apparatus 200.

The control valve 300 can have a rated flow capacity defining a volume of fluid that can flow through the control valve 300 during a specified time interval. The rated flow capacity at a certain pressure drop can be based on the components of the control valve 300 such as the valve trim apparatus 200. For example, the rated flow capacity can vary based on the lattice density of the inner cage portion 214 and/or the flow area of the first openings 208 and/or the third openings 228.

Furthermore, as noted above in connection with the control valve 100 of FIG. 1, some control valves are susceptible to flow circulation conditions. Contrary to the control valve 100 of FIG. 1 and other control valves, the example valve trim apparatus 200 of the illustrated example reduces or eliminates a flow circulation condition from occurring in a lower area 318 (e.g., a lower bowl area) of the control valve 300. Specifically, because the valve plug 202 slides along the outer surface 225 of the cage 204, when the valve plug 202 moves from a closed position to an open position, an inner area or volume of a portion inside the cage 204 that is exposed to fluid flow in the fluid passageway 304 from the inlet 306 does not vary (e.g., as opposed to a varying volume inside the cage 110 of FIG. 1 when the valve plug 114 moves from a closed position to an open position).

In other words, the volume of the cage 204 of the illustrated example that is exposed to fluid flow in the fluid passageway 304 from the inlet 306 does not change due to travel of the valve plug 202 because the valve plug 202 slides along the outer surface 225 of the cage 208. As a result, in some examples, the valve trim apparatus 200 reduces or prevents a flow circulation condition in the lower bowl area 318 that may otherwise occur and/or cause unstable plug motion and/or significant vibration. For example, because the volume of the portion inside the cage 204 that is exposed to fluid flow from the fluid passageway 304 does not change due to travel of the valve plug 202, the lower area 318 can be designed such that flow circulation is stable and/or does not cause excessive vibration. Thus, the valve trim apparatus 200 of the illustrated example can reduce or eliminate flow circulation from forming or occurring in the lower bowl area 318.

Figure 4:
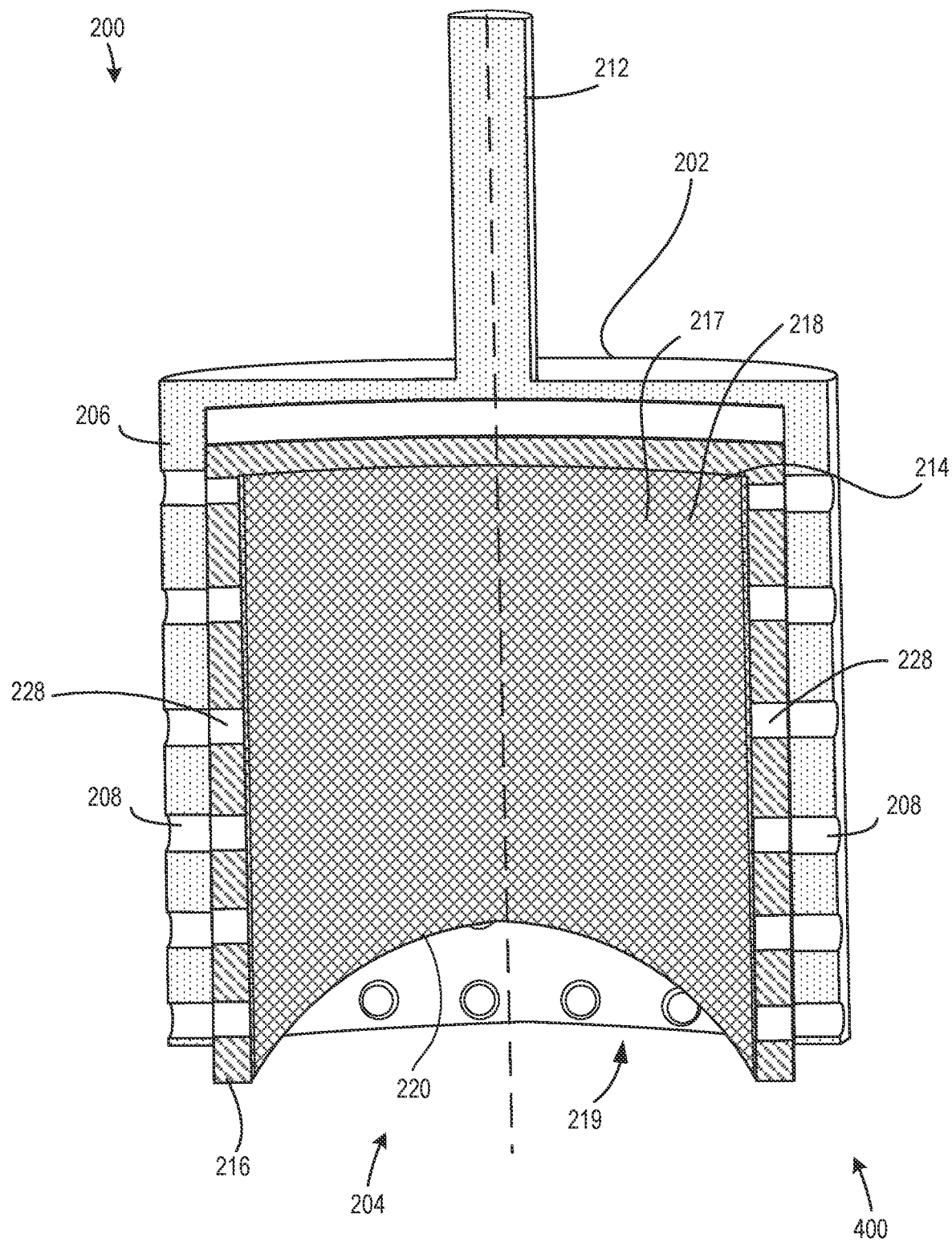
FIG. 4 is a perspective cross-sectional view of the example valve trim apparatus of FIGS. 2A and 2B shown in an example first position.

FIG. 4 is a cross-sectional view of the valve trim apparatus 200 of FIGS. 2A, 2B and 3 shown in an example first position 400. The example first position 400 of the illustrated example is a fully open position. In the first position 400, the first openings 208 of the plug 202 are in fluid communication with the third openings 228 of the cage 204. Specifically, in the position 400 of FIG. 4, the first openings 208 are coaxially aligned with the third openings 228 to enable fluid flow (e.g., maximum fluid flow) through the first and third openings 208, 228. In a flow-up configuration, fluid enters the passageway 219 of the inner cage portion 214 via the outlet edge 220 and flows radially outward through the lattice pattern 217 of the inner cage portion 214 via the second openings 218. When the plug 202 is in the first position 400, the fluid passes through the outer cage portion 216 via the third openings 228, and through the sidewall 206 of the plug 202 via the first openings 208. The fluid continues to flow to the fluid outlet 308 of the valve body 302.

In the example described above, the second openings 218 of the inner cage portion 214 can cause jet separation of the fluid as the fluid passes through the valve trim apparatus 200. As such, jet separation can reduce noise and/or cavitation in the control valve 300. As explained above in conjunction with FIGS. 2A and 2B, the shape, size, and/or spacing of the second openings 218 of the lattice pattern 217 can be formed to provide different or desired flow characteristics. In some examples, the shape, size, and/or spacing of the first openings 208, the second openings 218 and/or the third openings 228 can be adjusted based on jet separation properties. For example, the size and/or shape of the second openings 218 can vary to adjust or provide different jet separation characteristics. In some examples, the size and/or shape of the first openings 208, the second openings 218 and/or the third openings 228 can vary to adjust or provide different jet separation characteristics and/or flow capacity properties. For instance, smaller diameter openings affect jet separation characteristics and larger sized openings affect flow capacity characteristics. In some examples, the openings 208, 218, 228 (e.g., the second openings 218) can have different sizes to balance jet separation characteristics and flow capacity characteristics.

Alternatively, when the control valve 300 is configured in a flow-down configuration, in the first position 400, fluid flows first through the sidewall 206 via the first openings 208, through the outer cage portion 216 via the third openings 228, through the inner cage portion 214 via the second openings 218, and exits the valve trim apparatus 200 via the passageway 219 provided by the outlet edge 220.

By reducing the flow through area (e.g., a diameter of the first openings 208, cross-sectional flow through area of the second openings 218, etc.) from the first openings 208 to the second openings 218, the cage valve trim apparatus 200 causes fluid flowing therethrough to have a gradual pressure drop and, thus, a gradual velocity increase as the fluid flows across the plug 202 and the cage 204 when the plug 202 moves away from the valve seat 310 (FIG. 3). As such, the gradual pressure drop and gradual velocity increase can reduce turbulent flow as the fluid flows across the valve trim apparatus 200 to reduce noise and/or cavitation in the control valve 300.

Additionally, as noted above, the first openings 208 of the sidewall 206 can cause jet separation of the process fluid to reduce cavitation and/or noise in the control valve. In some examples, the first openings 208 include pressure staging to facilitate a gradual pressure drop to further reduce noise and/or cavitation. For example, the first openings 208 can have a first diameter at a first portion and a second diameter at a second portion coaxially aligned with the first portion. As such, the first openings can include multi-stage passageways along a longitudinal flow path of a respective one of the first openings 208. As a result, each stage of the flow path of a corresponding one of the first openings undergoes a portion of the pressure drop that occurs between the outer surface 207 of the sidewall 206 to the inner surface 209 of the sidewall 206.

In a flow-up configuration, the outlet edge 220 can increase the volumetric area of the inner cage portion 214 through which the fluid flows. With the inclusion of the outlet edge 220, at a given fluid pressure, the fluid can flow further into the inner cage portion 214 (e.g., more toward the valve stem 212) before exiting the cage 204 via the third openings 228. Thus, a larger portion of the inner cage portion 214 and the third openings 228 can accommodate greater fluid mass or fluid flow, increasing the flow capacity of the valve trim apparatus 200.

Similarly, in a flow-down configuration, the passageway 219 defined by the outlet edge 220 allows for fluid to flow through a first portion of the third openings 228 before exiting the valve trim apparatus 200 at the outlet edge 220. Thus, in both flow-up and flow-down configurations, the indentation of the outlet edge 220 can increase the flow capacity of the valve trim apparatus 200 while maintaining jet separation and/or pressure staging capabilities.

Figure 5:
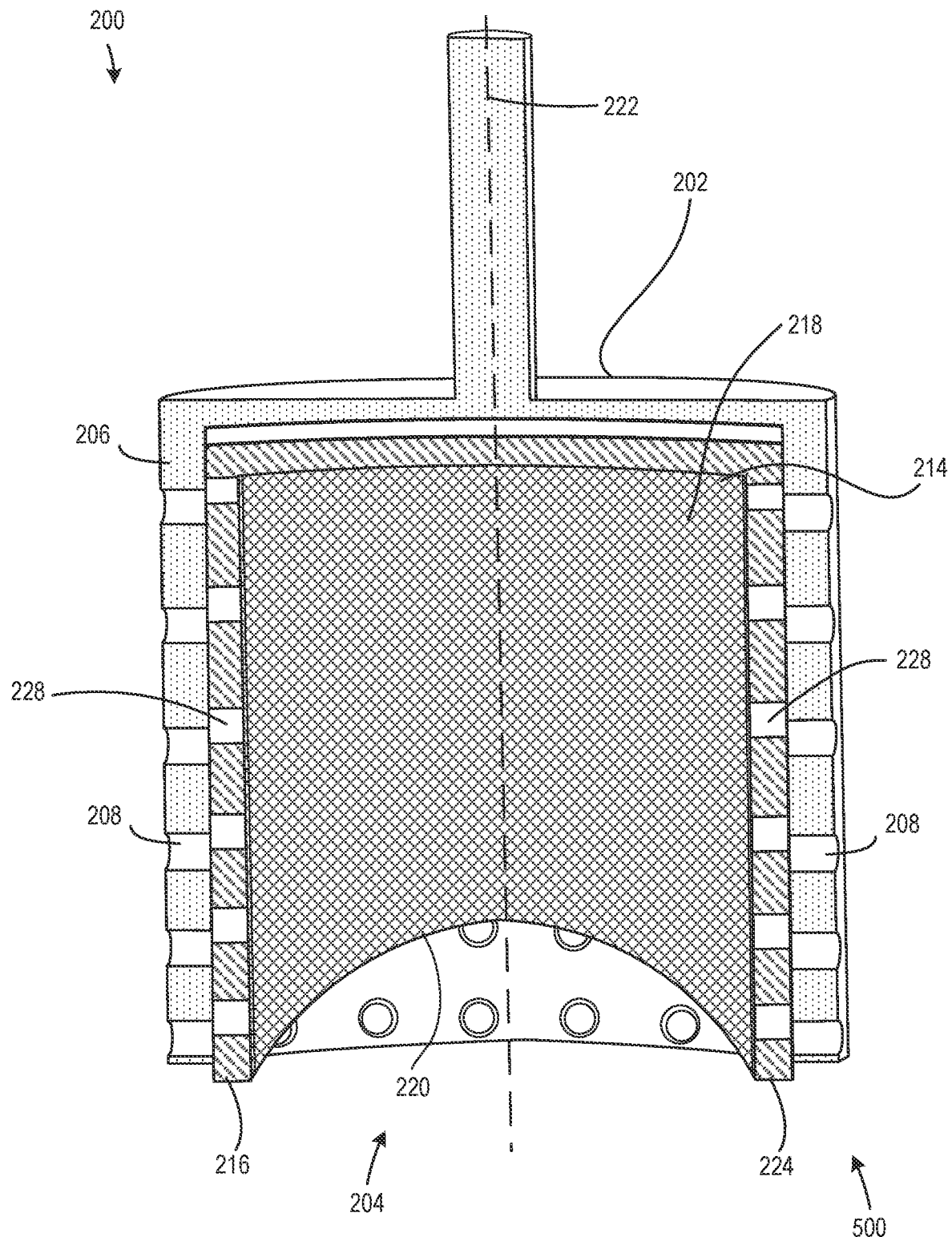
FIG. 5 is a perspective cross-sectional view of the example valve trim apparatus of FIGS. 2A and 2B shown an example second position.

FIG. 5 is a cross-sectional view of the valve trim apparatus 200 shown in an example second or intermediate position 500. The second position 500 is a partially open position. In the position 500, the plug 202 is positioned relative to the cage 204 such that the first openings 208 are in partial fluid communication with the third openings 228. Specifically, the first openings 208 partially overlap the third openings 228. In other words, the first openings 208 are not coaxially aligned with the third openings 228. To this end, a portion of the sidewall 206 blocks or overlaps a portion of the third openings 228 and a portion of the sidewall 224 of the outer cage portion 216 partially blocks or overlaps a portion of the first openings 208. As a result, the flow path or flow capacity (e.g., a flow area) through the first and third openings 208, 228 when the plug 202 is in the second position 500 is less than a flow capacity (e.g., a flow area) through the openings 208, 228 when the plug 202 is in the first position 400. To move the plug 202 to the second position 500 (e.g., a partially open position), the actuator moves the plug 202 relative to the cage 204 along the central axis 222.

In the second position 500, the fluid entering the interior region of the inner cage portion 214 via the outlet edge 220 can flow radially outward through the inner cage portion via the second openings 218, through the outer cage portion 216 via the third openings 228, and then exit the valve trim apparatus 200 through the sidewall 206 via the first openings 208. A flow rate (e.g., or flow area) through the valve trim apparatus 200 is reduced in the second position 500 compared to the first position 400.

Figure 6:
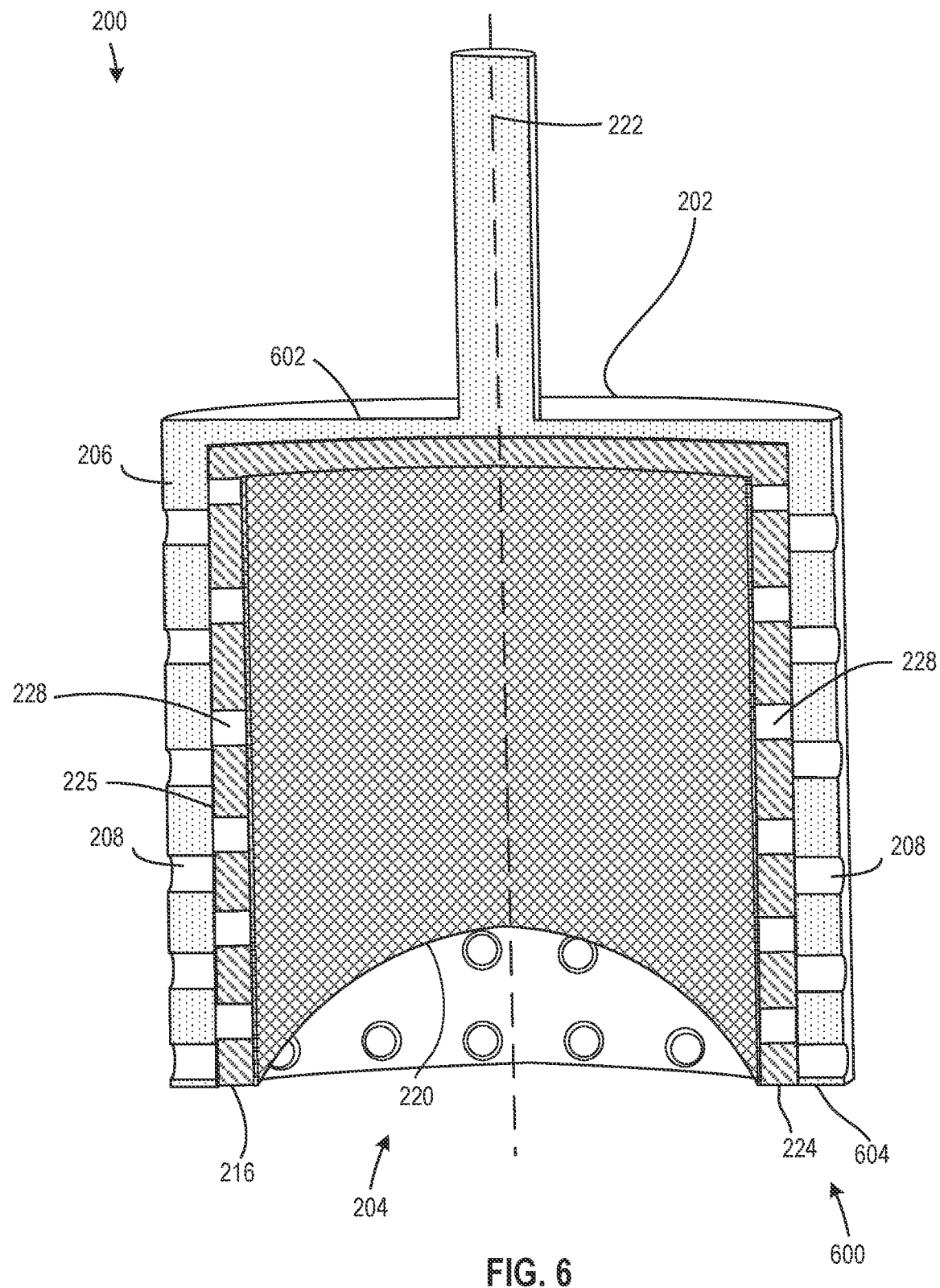
FIG. 6 is a perspective cross-sectional view of the example valve trim apparatus of FIGS. 2A and 2B shown in an example third position.

FIG. 6 is a cross-sectional view of the valve trim apparatus 200 shown in a third position 600. The third position 600 is a fully closed position. To move the plug 202 to the third position 600 (e.g., a fully closed position), the actuator moves the plug 202 relative to the cage 204 along the central axis 222. In the third position 600, the plug 202 (e.g., sealingly) engages the valve seat 310 (FIG. 3). In some examples in the third position 600, the plug 202 can be disengaged from the valve seat 310.

Specifically, in the closed position 600, the first openings 208 do not overlap the third openings 228. In other words, the first openings 208 are not coaxially aligned with the third openings 228. Thus, the first openings 208 are not in fluid communication with the third openings 228. As a result, a seal is formed between the inner surface 209 of the sidewall 206 of the plug 202 and the outer surface 225 of the sidewall 224 of the cage 204. The seal restricts or prevents fluid flow through the valve trim apparatus 200 and thus the control valve 300. To provide the seal, the sidewall 206 of the plug 202 blocks or aligns with the third openings 228 of the cage 204 and the sidewall 224 of the outer cage portion 216 blocks or aligns with the first openings 208 of the plug 202. In other words, the sidewall 206 of the plug 202 fully or completely blocks the third openings 228 to prevent fluid flow through the third openings 228, and the sidewall 224 of the outer cage portion 216 fully or completely blocks the first openings 208 to prevent fluid flow through the first openings 208. Thus, in a flow-up configuration, although fluid can flow from the inlet 306 (FIG. 3) to the third openings 228, the plug 202 blocks or prevents fluid flow through the first openings 208 and to the outlet 308 (FIG. 3). Likewise, in a flow-down configuration, although fluid can flow from the outlet 308 (FIG. 3) to the first openings 208 of the plug 202, the cage 204 blocks or prevents fluid flow through the third openings 228 and to the inlet 306 (FIG. 3). In either the flow-up or flow-down confirmation, the plug 202 sealingly engages the valve seat 310 in the third position 600 to prevent fluid flow between the plug 202 and the valve seat 310. In other words, the plug 202 moves relative to the outer surface 225 of the cage 204 between the first position 400 (and/or the second position 500) to allow fluid flow through the lattice pattern 217 (e.g., or lattice structure) and the third position 600 to prevent fluid flow through the lattice pattern 217 (e.g., or lattice structure).

In the examples disclosed herein, as noted above, the plug 202 has a non-contiguous sidewall 206 (e.g., contains the first openings 208). Thus, an axial distance to move the plug 202 from the first position 400 (e.g., a fully open position) to the third position 600 (e.g., a fully closed position) can be substantially less (e.g., less than 25 percent) than the axial height of the plug 202 (e.g., a distance from a top edge 602 of the plug 202 to a bottom edge 604 of the plug 202). The example valve trim apparatus 200 can enable a low-profile configuration. Additionally, as noted above, the valve trim apparatus 200 disclosed herein reduces and/or eliminates cavitation and/or noise. Further, the valve trim apparatus 200 enables reducing and/or eliminating vibration due to unstable flow circulation in a lower bowl area of the control valve 300.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Example methods, apparatus, systems, and articles of manufacture to implement a valve trim apparatus for use with control valves are disclosed herein. Further examples and combinations thereof include the following:

Example 1 includes a valve, comprising a valve body including a fluid inlet, a fluid outlet, and a fluid passageway extending between the fluid inlet and the fluid outlet; and a valve trim apparatus disposed in the fluid passageway, the valve trim apparatus including a plug and a cage, the plug circumscribing the cage, the plug including first openings, the cage including second openings, the plug movable relative to the cage between a first position to enable fluid communication between the first openings of the plug and the second openings of the cage, and a second position to prevent fluid communication between the first openings of the plug and the second openings of the cage.

Example 2 includes the valve of example 1, wherein the cage includes an inner cage portion and an outer cage portion, the inner cage portion defining a lattice structure defining third openings, the outer cage portion including the second openings.

Example 3 includes the valve of examples 1 and 2, wherein the inner cage portion is fixed to the outer cage portion.

Example 4 includes the valve of any one of examples 1-3, wherein the plug defines a cavity to receive the cage.

Example 5 includes the valve of any one of examples 1-4, wherein in the first position, the first openings at least partially align with the second openings and, in the second position, the first openings do not align with the second openings.

Example 6 includes the valve of any one of examples 1-5, wherein fluid flow through the fluid passageway is blocked when the plug is in the second position.

Example 7 includes the valve of any one of examples 1-6, wherein the first position defines a fully open position to allow fluid flow through the fluid passageway.

Example 8 includes the valve of any one of examples 1-7, wherein an axial distance between the first position and the second position is less than twenty-five percent of a length between a top edge of the plug and a bottom edge of the plug.

Example 9 includes the valve of any one of examples 1-8, wherein an inner surface of the plug and an outer surface of the cage form a seal to at least one of restrict or prevent fluid flow through the fluid passageway of the valve body when the plug is in the second position relative to the cage.

Example 10 includes an apparatus, comprising a plug including a sidewall having first openings, the plug defining a cavity; and a cage positioned in the cavity of the plug, the cage having an inner cage portion including a lattice structure having second openings and an outer cage portion circumscribing the inner cage portion, the outer cage portion including third openings, the plug movable relative to the cage.

Example 11 includes the apparatus of example 10, wherein the plug is movable relative to the cage in an axial direction between a first position at which the first openings align with the third openings to allow fluid flow through the cage and a second position at which the first openings do not align with the third openings to prevent fluid flow through the cage.

Example 12 includes the apparatus of examples 10 and 11, wherein the outer cage portion is fixedly coupled to the inner cage portion.

Example 13 includes the apparatus of any one of examples 10-12, wherein each of the second openings of the lattice structure provides a flow through area that is less than a flow through area of at least respective ones of the first openings or the second openings.

Example 14 includes the apparatus of any one of examples 10-13, wherein the lattice structure includes an opening at an edge of the cage proximate a lower edge of the cage.

Example 15 includes the apparatus of any one of examples 10-14, wherein the opening has a hyperbolic shape.

Example 16 includes a cage configured to be disposed in a fluid passageway of a valve body, the cage comprising an inner cage portion including a lattice structure providing first openings between an upper edge of the cage and a lower edge of the cage, the lattice structure including an aperture at an edge of the cage proximate the lower edge; and an outer cage portion circumscribing the inner cage portion, the outer cage portion containing second openings.

Example 17 includes the cage of example 16, wherein the outer cage portion is fixedly coupled to the inner cage portion.

Example 18 includes the cage of examples 16 and 17, wherein the aperture has a hyperbolic shape.

Example 19 includes the cage of any one of examples 16-18, further including a valve plug, the valve plug having a cavity to at least partially receive the cage, the valve plug to move relative to an outer surface of the cage between a first position to allow fluid flow through the lattice structure and a second position to prevent fluid flow through the lattice structure.

Example 20 includes the cage of any one of examples 16-19, wherein a flow area of the second openings is greater than a flow area of the first openings.

Although certain example methods, apparatus and articles of manufacture have been described herein, the scope of coverage of this patent is not limited thereto. Such examples are intended to be non-limiting illustrative examples. On the contrary, this patent covers all methods, apparatus and articles of manufacture fairly falling within the scope of the appended claims either literally or under the doctrine of equivalents.

What is claimed is:

1. A valve, comprising:
a valve body including a fluid inlet, a fluid outlet, and a fluid passageway extending between the fluid inlet and the fluid outlet; and
a valve trim apparatus disposed in the fluid passageway, the valve trim apparatus including a plug and a cage, the plug circumscribing the cage, the plug including first openings, the cage including second openings, the cage including an inner cage portion and an outer cage portion, the inner cage portion defining a lattice structure defining third openings, the outer cage portion including the second openings, the plug movable relative to the cage between a first position to enable fluid communication between the first openings of the plug and the second openings of the cage, and a second position to prevent fluid communication between the first openings of the plug and the second openings of the cage.

2. The valve of claim 1, wherein the inner cage portion is fixed to the outer cage portion.

3. The valve of claim 1, wherein the plug defines a cavity to receive the cage.

4. The valve of claim 1, wherein in the first position, the first openings at least partially align with the second openings and, in the second position, the first openings do not align with the second openings.

5. The valve of claim 1, wherein fluid flow through the fluid passageway is blocked when the plug is in the second position.

6. The valve of claim 1, wherein the first position defines a fully open position to allow fluid flow through the fluid passageway.

7. The valve of claim 1, wherein an axial distance between the first position and the second position is less than twenty-five percent of a length between a top edge of the plug and a bottom edge of the plug.

8. The valve of claim 1, wherein an inner surface of the plug and an outer surface of the cage form a seal to at least one of restrict or prevent fluid flow through the fluid passageway of the valve body when the plug is in the second position relative to the cage.

9. The valve of claim 1, wherein the trim apparatus further includes a valve seat, the valve plug to engage the valve seat in the second position to prevent fluid flow through the fluid passageway.

10. An apparatus, comprising:
a plug including a sidewall having first openings, the plug defining a cavity; and
a cage positioned in the cavity of the plug, the cage having an inner cage portion including a lattice structure having second openings and an outer cage portion circumscribing the inner cage portion, the outer cage portion including third openings, the plug movable relative to the cage.

11. The apparatus of claim 10, wherein the plug is movable relative to the cage in an axial direction between a first position at which the first openings align with the third openings to allow fluid flow through the cage and a second position at which the first openings do not align with the third openings to prevent fluid flow through the cage.

12. The apparatus of claim 10, wherein the outer cage portion is fixedly coupled to the inner cage portion.

13. The apparatus of claim 10, wherein each of the second openings of the lattice structure provides a flow through area that is less than a flow through area of at least respective ones of the first openings or the second openings.

14. The apparatus of claim 10, wherein the lattice structure includes an opening at an edge of the cage proximate a lower edge of the cage.

15. The apparatus of claim 14, wherein the opening has a hyperbolic shape.

16. A cage configured to be disposed in a fluid passageway of a valve body, the cage comprising:
an inner cage portion including a lattice structure providing first openings between an upper edge of the cage and a lower edge of the cage, the lattice structure including an aperture at an edge of the cage proximate the lower edge, the aperture having a hyperbolic shape; and
an outer cage portion circumscribing the inner cage portion, the outer cage portion containing second openings.

17. The cage of claim 16, wherein the outer cage portion is fixedly coupled to the inner cage portion.

18. The cage of claim 16, wherein a flow area of the second openings is greater than a flow area of the first openings.

19. A valve trim assembly to be disposed in a fluid passageway of a valve body, the valve trim assembly comprising:
an inner cage portion including a lattice structure providing first openings between an upper edge of the cage and a lower edge of the cage, the lattice structure including an aperture at an edge of the cage proximate the lower edge;
an outer cage portion circumscribing the inner cage portion, the outer cage portion containing second openings; and
a valve plug, the valve plug having a cavity to at least partially receive the cage, the valve plug to move relative to an outer surface of the cage between a first position to allow fluid flow through the lattice structure and a second position to prevent fluid flow through the lattice structure.

20. The valve trim assembly of claim 19, wherein a flow area of the second openings is greater than a flow area of the first openings.

* * * * *